US011623881B2

(12) United States Patent
Duez et al.

(10) Patent No.: US 11,623,881 B2
(45) Date of Patent: *Apr. 11, 2023

(54) VEHICLE SYSTEM FOR INJECTING AN AQUEOUS SOLUTION IN THE COMBUSTION CHAMBER OF THE INTERNAL COMBUSTION ENGINE AND METHOD FOR INJECTING AN AQUEOUS SOLUTION IN THE COMBUSTION CHAMBER OF THE INTERNAL COMBUSTION

(71) Applicant: PLASTIC OMNIUM ADVANCED INNOVATION AND RESEARCH, Brussels (BE)

(72) Inventors: Laurent Duez, Uccle (BE); Arthur Relave-Noiray, Brussels (BE); Stephane Leonard, Brussels (BE); Pierre De Keyzer, Watermael Boitsfort (BE); Beatriz Monge-Bonini, Woluwe Saint-Pierre (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 101 days.

This patent is subject to a terminal disclaimer.

(21) Appl. No.: 16/971,591

(22) PCT Filed: Mar. 19, 2019

(86) PCT No.: PCT/EP2019/056823
§ 371 (c)(1),
(2) Date: Aug. 20, 2020

(87) PCT Pub. No.: WO2019/180010
PCT Pub. Date: Sep. 26, 2019

(65) Prior Publication Data
US 2021/0078879 A1 Mar. 18, 2021

(30) Foreign Application Priority Data
Mar. 19, 2018 (EP) .................................. 18162607

(51) Int. Cl.
C02F 1/50 (2006.01)
F02M 25/028 (2006.01)
F02M 25/022 (2006.01)
F24H 1/00 (2022.01)

(52) U.S. Cl.
CPC ............. *C02F 1/50* (2013.01); *F02M 25/028* (2013.01); *C02F 2303/04* (2013.01); *C02F 2303/20* (2013.01); *F02M 25/0221* (2013.01); *F24H 1/009* (2013.01)

(58) Field of Classification Search
CPC .. F24H 1/009; F02M 25/0221; F02M 25/028; C02F 1/50
See application file for complete search history.

(56) References Cited

U.S. PATENT DOCUMENTS

| 11,415,085 B2* | 8/2022 | De Keyzer ........ F02M 25/0222 |
| 2007/0106349 A1 | 5/2007 | Karni et al. |
| 2009/0229581 A1 | 9/2009 | Ikeda |
| 2010/0220984 A1 | 9/2010 | Potier et al. |
| 2012/0015200 A1 | 1/2012 | Ali et al. |
| 2014/0093226 A1* | 4/2014 | Potier ................... F01N 3/2066 |
| | | 392/441 |
| 2016/0195300 A1 | 7/2016 | Potier et al. |
| 2017/0320732 A1 | 11/2017 | Gourley et al. |
| 2017/0342945 A1 | 11/2017 | Neubauer et al. |

FOREIGN PATENT DOCUMENTS

| CN | 101527978 A | 9/2009 |
| CN | 101823820 A | 9/2010 |
| CN | 103403130 A | 11/2013 |
| CN | 104728510 A | 6/2015 |
| CN | 106714344 A | 5/2017 |
| CN | 107277948 A | 10/2017 |
| DE | 10 2017 003 732 A1 | 11/2017 |
| EP | 0 880 929 A2 | 12/1998 |
| EP | 1 946 638 A2 | 7/2008 |

(Continued)

OTHER PUBLICATIONS

International Search Report dated Apr. 15, 2019 in PCT/EP2019/056823 filed on Mar. 19, 2019.

(Continued)

*Primary Examiner* — Kevin A Lathers
(74) *Attorney, Agent, or Firm* — Oblon, McClelland, Maier & Neustadt, L.L.P.

(57) ABSTRACT

The present invention relates to a heater for a vehicle system for injecting anaqueous solution in an air intake line upstream of a combustion chamber of aninternal combustion engine, or in the combustion chamber of the internal combustion engine, said heater comprising at least one flexible part which comprises at least one metallic resistive track embedded in an insulating material, said insulating material comprising at least one antimicrobial compound and/or being coated by at least one layer containing at least one antimicrobial compound. The invention relates also to a vehicle system for injecting an aqueous solution in an air intake line upstream of a combustion chamber of an internal combustion engine, or in the combustion chamber of the internal combustion engine comprising said heater.

18 Claims, No Drawings

(56) References Cited

FOREIGN PATENT DOCUMENTS

| | | | |
|---|---|---|---|
| EP | 1946638 A2 * | 7/2008 | ............. A01N 25/02 |
| EP | 3 018 331 A1 | 5/2016 | |
| JP | 63-95032 | 6/1988 | |
| JP | 2000-328440 | 11/2000 | |
| JP | 2003-048808 | 2/2003 | |
| JP | 2009-199808 | 9/2009 | |
| JP | 2010-248124 | 11/2010 | |
| WO | WO 02/087339 A1 | 11/2002 | |
| WO | WO 2006/092887 A1 | 9/2006 | |
| WO | WO 2012/048638 | 4/2012 | |
| WO | WO 2012/048638 A1 | 4/2012 | |
| WO | WO 2012/068633 A1 | 5/2012 | |
| WO | WO 2014/048638 A1 | 4/2014 | |
| WO | WO 2014/080266 A1 | 5/2014 | |
| WO | WO 2016/177556 A1 | 11/2016 | |
| WO | WO 2016/203564 A1 | 12/2016 | |
| WO | WO 2019/008058 A1 | 1/2019 | |

OTHER PUBLICATIONS

Office Action dated Dec. 5, 2022, in Japanese Patent Application No. 2020-549795 (with English-language Translation). (References 15,16,17,18,19 and 20 are cited therein).

* cited by examiner

VEHICLE SYSTEM FOR INJECTING AN AQUEOUS SOLUTION IN THE COMBUSTION CHAMBER OF THE INTERNAL COMBUSTION ENGINE AND METHOD FOR INJECTING AN AQUEOUS SOLUTION IN THE COMBUSTION CHAMBER OF THE INTERNAL COMBUSTION

The present invention relates to a heater having antimicrobial properties for water tank used a vehicle system for injecting an aqueous solution in the combustion chamber of the internal combustion engine. A further aspect of the invention relates to a water tank comprising a heater having antimicrobial properties and to a vehicle system for injecting an aqueous solution in the combustion chamber of the internal combustion engine comprising said tank.

Due to increasing requirements for reduced carbon dioxide emissions, internal combustion engines are increasingly being optimized regarding fuel consumption. However, this optimisation is limited by premature ignition of the fuel and high exhaust gas temperatures. One possible measure for reducing the exhaust gas temperatures and the premature ignition is the injection of water in the combustion chamber. In internal combustion engines, water injection system can spray water into the incoming air or fuel-air mixture, or directly into the combustion chamber to cool certain parts of the combustion chamber where "hot points" could produce premature ignition. Many water injection systems use a mixture of water and alcohol or other additives. The water provides the primary cooling effect due to its great density and high heat absorption properties. The alcohol is combustible, and also serves as an antifreeze for the water. In the scope of the present patent application, those mixtures are designated by the terms "aqueous solution". To this end, separate water injection systems can be provided for enabling the water injection. For example, WO 2014/080266 A1 discloses a vehicle system for injecting water in the combustion chamber of an internal combustion engine.

A known problem with water injection systems is that water can contain impurities that, in turn, promote the growth of bacteria, algae, fungi or other microorganisms. Such a contamination occurs especially in the water tank when the vehicle is immobilized for a long period. This can lead to a malfunction of the system up to the failure as well as to a clogging of filters which are arranged in the water injection system. To prevent such contamination or to eradicate an already present contamination, one could think about using chemical products. However, the injection of such chemicals in the combustion chamber can lead to other problems.

WO2016/177556 A1 proposes to decontaminate water contained in a water tank for a water injection system by exposing the water to UV radiation. This solution is not optimal for several reasons. The UV radiator must be energized to produce a decontaminating effect. By way of consequence, the growth of bacteria, algae, fungi or other microorganisms is not inhibited when the vehicle is immobilized for a long period and the UV radiator not energized. In this context, it is particularly important to note that the microorganisms contaminating water have the effect of altering the chemical properties of the water by releasing ionic species. Even if, the water is later decontaminated (for example with chemicals or UV radiations), the chemical properties of the water do not go back to their initial state.

Moreover, UV radiators are expensive and complex. They are also relatively fragile so that they must be replaced periodically. Their location in the water tank makes the replacement operation difficult and costly. Finally, the growth of bacteria, algae, fungi or other microorganisms is promoted by the action of high temperatures in some hot spots of the tank, said hot spots may be located in spots which are not accessible to the UV radiations.

WO2012/048638 proposes an armoured resistance for heating the water of an electric storage water heater or a dishwasher. The metal surface in contact with the water to be heated hereof is covered with a glass enamel having antibacterial properties. However, the heater disclosed in this document is not suitable for automotive application because a vehicle must work under thermal constraints (e.g. freeze) which is not the case of a water heater or a dish washer. Moreover, a surface covered with a glass enamel must not be deformable otherwise the enamelled glass will crack and lose its protective effect on the surface.

The invention aims at providing an improved vehicle system for injecting an aqueous solution in the combustion chamber of an internal combustion engine that does not show the above problems. More particularly, the invention provides a solution to treat against the growth of bacteria, algae, fungi or other microorganisms in hot spots of a tank of vehicle system for injecting an aqueous solution in the combustion chamber of an internal combustion engine.

In particular, it is a first objective of the invention to provide a solution to treat against the growth of bacteria, algae, fungi or other microorganisms in hot spots of a tank of a vehicle system for injecting an aqueous solution in the combustion chamber of an internal combustion engine.

A second objective is to provide an aqueous solution injection system that does not require to be energized in order to be operational so that the problem of contamination does not occur even in case of extended periods of parking of the vehicle.

A third objective of the present invention is to provide an aqueous solution injection system that is cheaper, that does not require extensive, expensive and frequent maintenance operations.

According to a first embodiment of the invention, these objectives are reached with a heater for a aqueous solution tank of a vehicle system for injecting an aqueous solution in an air intake line upstream of a combustion chamber of an internal combustion engine, or in the combustion chamber of the internal combustion engine, said heater comprising at least one metallic resistive track embedded in an insulating material, said insulating material comprising at least one antimicrobial compound and/or being partly or totally, preferably totally, coated by at least one layer containing at least one antimicrobial compound.

According to the invention, a heater made of an insulating material comprising at least one antimicrobial compound and/or being coated by at least one layer containing at least one antimicrobial compounds leads to a decrease of the microbial growth more specifically at the hot spots of the aqueous solution tank of a vehicle system for injecting an aqueous solution in an air intake line upstream of a combustion chamber of an internal combustion engine, or in the combustion chamber of the internal combustion engine; said heater being the source of some hot spots in the tank.

By the expression "insulating material", we intend to mean a material which does not allow the electricity to pass through them; said insulating material having a resistivity of at least $10^{12}$ ohms meter, preferably a resistivity of at least $10^{13}$ ohms meter and more preferably a resistivity of at least $10^{19}$. Ohms metre; said resistivity being measured at a temperature of 25° C.

By the expression "antimicrobial compound", we intend to mean that the compound prevents the development of microbial species such as bacteria, algae and/or fungi. The antimicrobial effect of the antimicrobial compound is measured according to the norm ISO22196:2011 or to the norm ISO 16869:2008 depending on the nature of the microbial species. The antimicrobial compound is present in an effective amount in the insulating material. In the sense of the present invention, an effective amount is an amount that will produce the effect of inhibiting the growth of microbial species bacteria by at least 80% as measured according to the norm ISO22196:2011 or to the norm ISO 16869:2008 depending on the nature of the microbial species.

By the expression "aqueous solution tank", we intend to mean a tank containing an aqueous solution, preferably demineralized water. By the expression demineralized water, we intend to mean an aqueous solution having a conductivity lower than 50 μS/cm and preferably lesser than 5 μS/cm.

By the expression "metallic resistive track", we intend to mean a metallic track which dissipates heat by Joule heating when running current through it. The sectional shape of the metallic resistive track may be a circle in case of a wire, preferably the sectional shape of the track is a rectangle.

According to an embodiment, the at least one metallic resistive track of the heater is made in coper, aluminium or stainless steel, preferably the at least one metallic resistive track is made in stainless steel.

According to an embodiment, the insulating material is made of silicone resin, polyolefin, polyethylene, thermoplastic elastomer, polyester, polyimide, preferably said insulating material is made in silicone resin, polyethylene, polypropylene, most preferably is made in silicone resin or high density polyethylene.

According to a preferred embodiment, the at least one resistive track is sandwiched between two films of said insulating material or overmoulded in said insulating material.

By the expression "the at least one resistive track is sandwiched between two films of said insulating material", we intend to mean that the at least one resistive track is inserted between two film of said insulating material which are welded together.

According to a preferred embodiment, the heater comprises a body and at least one excrescence or tentacle equipped with at least one part of the at least one resistive track.

Said at least one excrescence or tentacle equipped with at least one part of the at least one resistive track permits to improve the heating of plots of the tank which are not accessible with the main body.

According to a preferred embodiment, the heater comprises fixation means, said fixation means being preferably selected from the group consisting of clips, rivets, bolts and through holes.

The presence of fixation means on the heater permits a mechanical fixation of the heater to at least wall of a water tank used a vehicle system for injecting an aqueous solution in the combustion chamber of the internal combustion engine, preferably the heater is fixed on the bottom wall of the water tank.

By the expression "the bottom wall of the water tank", we intend to mean that the bottom wall is the wall of the of the water tank which is located the nearest to the road.

According to a preferred embodiment, the heater comprises at least one flexible part comprising at least one metallic resistive track and the insulating material embedding the at least one metallic resistive track is flexible as well. The qualifier "flexible" means easily deformable, this generally being in a reverse manner. Generally, this corresponds to a flexural rigidity (defined as being equal to $(Eh^3)/(12(1-v^2))$ where E is the Young's modulus of the flexible part measured according to the ASTM D790-03 standard, h is its thickness and v is the Poisson's ratio of its constituent material) below 4000 N·m, preferably, in the context of the invention, the rigidity of the flexible part is less than or equal to 1000 N·m, more preferably less than or equal to 100 N·m, the most preferably less than or equal to 10 N·m. According to a particularly preferred embodiment, the flexural rigidity of the at least one flexible part is less than or equal to 1 N·m. Preferably this flexible part is a heating part, that is to say a flexible part comprising one or more metallic resistive track.

An insulating material made of silicone resin, polyolefin, polyethylene, thermoplastic elastomer, polyester or polyimide is not subject to cracking as it is the case in the state of the art wherein the insulating material is an enamelled glass which is not a flexible material. Indeed, according to test method ISO 527, the elongation at break of polyethylene is more than 150% and elastomer is more than 100%, whereas the elongation at break of enamelled glass is less than 12% at room temperature (depending on the chemical composition of the glass). In the context of the invention, the flexural modulus of the insulating material is 10 to 100 times less than the flexural modulus of an enamelled glass. Indeed, according to test method ISO 178, the flexural modulus of silicone resin is less than 3.5 GPa, polyethylene is less than 1.3 GPa, thermoplastic elastomer is less than 0.7 GPa, polyester is less than 10 GPa and polyimide is less than 2.5 GPa, whereas the flexural modulus of a 5 mm thickness enamelled glass is more than 70 GPa at room temperature, with 50% of relative moisture, at a displacement rate of 0.5 mm per minute.

According to a preferred embodiment the at least one antimicrobial compound is selected from the group consisting of an organic antimicrobial compound and a metallic antimicrobial compound.

By the expression "organic antimicrobial compound", we intend to mean a compound consisting of carbon atoms covalently linked to atoms of carbon, hydrogen, oxygen, or nitrogen. Preferably, the organic antimicrobial compound is selected from the group consisting of N-Butyl-1,2-benziso-thiazolin-3-one (BBIT), 4,5-Dichloro-2-octyl-4-isothiazoli-none-3-one (DCOIT), 3-lodo-2-propynylbutyl carbamate (IPBC), 10,10-Oxybisphenoxarsine (OBPA), n-Octylisothi-azolinone (OIT) and 3-(tri-methoxysilyl) propyldimethyloc-tadecyl ammonium chloride By the expression "metallic antimicrobial compounds", we intend to mean an antimicrobial compound comprising a metallic atom. Preferably, the antimicrobial metallic compound is selected from the group consisting of a metal, a metallic alloy, a metallic solution, a metallic salt, a metallic oxide and a metallic complex. The at least one antimicrobial metallic compound is preferably a nanomaterial. By the term nanomaterial, we intend to mean an antimicrobial metallic compound in the form of particles in an unbound state or as an aggregate or as an agglomerate and where, for 50% or more of the particles in the number size distribution, one or more external dimensions is in the size range 1-100 nm. Preferably the antimicrobial metallic compound is in the form of nanoparticles having a diameter in the range of 1 to 10 nm. The antimicrobial metallic compound nanomaterial may be supported or dispersed on silicon oxide particles, aluminum oxide particle or zeolite.

More preferably, the flexible part comprises at least one flexible metallic resistive track.

More preferably, the metallic resistive track is embedded in a flexible insulating material.

According to a preferred embodiment, the metallic part of the at least one antimicrobial metallic compounds is selected from the group consisting of copper, silver, zinc, aluminum, nickel, gold, barium, tin, bore, thallium, antimony, cobalt, zirconium and molybdenum, preferably the metallic part of the at least one antimicrobial metallic compounds is selected from the group consisting of copper, zinc and silver.

According to an embodiment, the at least one antimicrobial metallic compound is an antimicrobial metallic compound of copper selected from the group consisting of copper, brass, bronze, cupronickel alloy, copper-nickel-zinc alloy, copper sulfate (I, II), coper oxide (I, II), copper hydroxide (I, II), copper pyrithione (I).

According to a preferred embodiment, the at least one antimicrobial metallic compound is an antimicrobial metallic compound of zinc and/or an antimicrobial metallic compound of silver. Preferably, the antimicrobial metallic compound of zinc is selected from the group consisting of zinc, zinc oxide and zinc pyrithione. The antimicrobial metallic compound of silver is preferably selected from the group consisting of silver, silver oxide, silver nitrate, silver chloride and silver carbonate.

More preferably, the at least one antimicrobial metallic compound is zinc pyrithione or a silver salt or nanoparticles of silver or a combination thereof. The inventors have surprisingly observed that even though pyrithione is hardly miscible in polymers, for example polyolefin, it appears that zinc pyrithione or silver salts are well encapsulated in the polyolefin matrix.

According to a preferred embodiment, the insulating material comprises at most 5% weight, preferably at most 0.5% weight, more preferably at most 0.2% weight, the most preferably at most 0.05% weight, of at least one antimicrobial metallic compound.

According to a preferred embodiment, the insulating material comprises at least 0.0002% weight, preferably at least 0.0015% weight, more preferably at least 0.01% weight, the most preferably 0.05% weight, of at least one antimicrobial metallic compound.

According to a preferred embodiment, the insulating material comprises at least one antimicrobial metallic compound, said at least one antimicrobial metallic compound being in an amount comprised in the range of 0,0002% weight to 5% of weight, preferably from 0.0015% weight to 0.4% weight, more preferably from 0.005% weight to 0.1% weight, the most preferably from 0.01% weight to 0.05%.

Another aspect of the invention is also to provide a vehicle system decreasing growth of bacteria, algae, fungi or other microorganisms.

The vehicle system according to the invention comprises the following constituents
- a tank for storing an aqueous solution;
- a pump unit;
- an air intake line upstream of a combustion chamber of an internal combustion engine;
- one or more injectors configured for injecting aqueous solution in the air intake line, in the combustion chamber or both;
- a feed line for feeding said injector with aqueous solution pumped by the pump unit and
- a heater according to the invention.

The following examples are given for the purpose of illustrating the present invention. A heater according to the invention comprising at least one metallic resistive track embedded in a silicone based insulating material containing different amount of antimicrobial compound has been tested. Table I summarizes the decontamination efficiency of the heater based on ratios of biocide compound embedded inside the insulating material of the heater on basis of ISO 22196.

TABLE I

Decontamination efficiency of a heater containing different amount of antimicrobial compounds

| Silicone based insulating material | | Biodecontamination efficiency on *Pseudomonas aeruginosa/ Aspergillus* sp. |
|---|---|---|
| Zinc pyrithione | 0.2% wt ratios | +++ |
| | 0.1% wt ratios | ++ |
| Silver | 0.034% wt ratios | +++ |
| | 0.017% wt ratios | + |

+++: Excellent
++: Good
+: Acceptable

Table II illustrates an example of the properties of aqueous solution used in the water tank.

TABLE II

Properties of an aqueous solution used in a vehicle system for injecting an aqueous solution in the combustion chamber of the internal combustion engine

| Conductivity <1 μS/cm | pH 5-8 | H2O 18.0 | Residue on Evaporation <10 mg/L | Chloride as Cl <1.0 mg/L |
|---|---|---|---|---|
| Heavy Metals (pB) <0.1 ppm | Nitrate <2 ppm | Silica as SiO2 <0.01 mg/L | Aluminium <0.05 mg/L | Antimony <0.1 mg/L |
| Arsenic <0.1 mg/l | Boron <0.05 mg/L | Barium <0.01 mg/L | Calcium <0.01 mg/L | Cadmiun <0.01 mg/L |
| Chromium <0.01 mg/L | Copper <0.01 mg/L | Iron <0.01 mg/L | Potassium <0.01 mg/L | Magnesium <0.01 mg/L |
| Manganese <0.01 mg/L | Molybdenum <0.01 g/L | Sodium <0.02 mg/L | Nickel <0.01 mg/L | Tin <0.01 mg/L |

The invention claimed is:

1. A heater for a vehicle system for injecting an aqueous solution in an air intake line upstream of a combustion chamber of an internal combustion engine, or in the combustion chamber of the internal combustion engine, said heater comprising at least one flexible part which comprises at least one metallic resistive track embedded in an insulating material, said insulating material comprising at least one antimicrobial compound embedded therein.

2. The heater for a vehicle system according to claim 1, wherein the at least one metallic resistive track is made in copper, aluminum or stainless steel.

3. The heater for a vehicle system according to claim 1, wherein
said insulating material is made of silicone resin, polyolefin, polyethylene, thermoplastic elastomer, polyester, polyimide.

4. The heater for a vehicle system according to claim 1, wherein the at least one metallic resistive track is sandwiched between two films of said insulating material or is overmoulded in said insulating material.

5. The heater for a vehicle system according to claim 1, wherein
the heater comprises a body and at least one excrescence or tentacle equipped with at least one part of the at least one metallic resistive track.

6. The heater for vehicle system according to claim 1, wherein said heater comprises fixation means selected from the group consisting of clips, rivets, bolts and through holes.

7. The heater for vehicle system according claim 1, wherein the antimicrobial compound is an antimicrobial metallic compound.

8. The heater for vehicle system according to claim 1, wherein the insulating material comprises at least one antimicrobial compound and the insulating material comprises at most 5% weight of the at least one antimicrobial metallic compound.

9. The heater for vehicle system according to claim 1, wherein the insulating material comprises at least one antimicrobial compound and
the insulating material comprises at least 0.0002% weight of the at least one antimicrobial metallic compound.

10. The heater for vehicle system according to claim 1, wherein the at least one antimicrobial metallic compound is selected from the group consisting of a metal, a metallic alloy, a metallic solution, a metallic salt, a metallic oxide and a metallic complex.

11. The heater for vehicle system according to claim 1, wherein the at least one flexible part comprises at least one flexible metallic resistive track.

12. The heater for vehicle system according to claim 1, wherein the at least one metallic resistive track is embedded in a flexible insulating material.

13. The heater for vehicle system according to claim 1, wherein the at least one antimicrobial metallic compound is zinc pyrithione or a silver salt or nanoparticles of silver or a combination thereof.

14. A vehicle system for injecting an aqueous solution in an air intake line upstream of a combustion chamber of an internal combustion engine, or in the combustion chamber of the internal combustion engine comprising a heater according to claim 1.

15. The vehicle system according to claim 14, wherein the heater is located inside an aqueous solution tank, at the bottom of said aqueous solution tank.

16. The heater for a vehicle system according to claim 1, wherein the at least one metallic resistive track is made in stainless steel.

17. The heater for a vehicle system according to claim 1, wherein said insulating material is made in silicone resin, polyethylene or polypropylene.

18. The heater for a vehicle system according to claim 1, wherein said insulating material is made in silicone resin or high density polyethylene.

* * * * *